United States Patent
Mann et al.

(10) Patent No.: US 6,330,281 B1
(45) Date of Patent: Dec. 11, 2001

(54) MODEL-BASED VIEW EXTRAPOLATION FOR INTERACTIVE VIRTUAL REALITY SYSTEMS

(75) Inventors: Yair Mann, Tel Aviv; Daniel Cohen-Or, Hod Hasharon; Assaf Monsa, Sha'ar Hefer; Yehuda Shemer; Uri Arad, both of Tel-Aviv, all of (IL)

(73) Assignee: Richfx Ltd., Bnai Brak (IL)

( * ) Notice: Subject to any disclaimer, the term of this patent is extended or adjusted under 35 U.S.C. 154(b) by 0 days.

(21) Appl. No.: 09/629,514

(22) Filed: Aug. 1, 2000

Related U.S. Application Data
(60) Provisional application No. 60/147,419, filed on Aug. 6, 1999.

(51) Int. Cl.[7] ............................... H04B 1/66; H04N 7/12
(52) U.S. Cl. ......................................................... 375/240.12
(58) Field of Search ............................. 375/240, 240.01, 375/240.05, 240.09, 240.1, 240.11, 240.12, 240.13, 240.14, 240.16, 240.24, 240.25; 348/415.1, 416.1, 417.1, 419.1, 420.1, 402.1; 345/419, 473; 382/238; H04B 1/66; H04N 7/12

(56) References Cited

U.S. PATENT DOCUMENTS

| | | | |
|---|---|---|---|
| 5,117,287 | 5/1992 | Koike et al. ...................... | 348/402.1 |
| 5,347,306 | 9/1994 | Nitta ..................... | 348/14.1 |
| 5,654,771 | * 8/1997 | Tekalp et al. ........................ | 348/699 |
| 5,742,289 | 4/1998 | Naylor et al. .................... | 375/240.15 |
| 5,936,671 | * 8/1999 | Van Beek et al. ................ | 348/413.1 |
| 5,949,422 | * 9/1999 | Machizuki et al. .................. | 345/420 |
| 6,005,625 | * 12/1999 | Yokoyama ........................... | 348/416 |
| 6,072,496 | * 6/2000 | Guenter et al. ...................... | 345/419 |
| 6,097,854 | * 8/2000 | Szeliski et al. ...................... | 382/284 |
| 6,154,216 | * 11/2000 | Walton ................................ | 345/430 |
| 6,243,448 | * 6/2001 | Penna .................................. | 382/154 |
| 6,263,468 | * 7/2001 | Kondo et al. ........................ | 714/774 |

FOREIGN PATENT DOCUMENTS

WO 98/30015   7/1998  (WO).

OTHER PUBLICATIONS

Bajaj, C. et al. Making 3D textures practical, Computer Graphic and Applications, 1999 Proceedings, Seventh Spacific Coorporation on. 1999, pp. 259, 368, 330.*

Shiaofen Fung et al., deformable vol. rendering by 3D texture mapping actree encoding, Visualization '96. Proceedings. 1996, pp. 73–80, 469.*

Jorn Ostermann, "Modelling of 3D moving objects for an analysis–synthesis coder," Sensing and Reconstruction of Three–Dimensional Objects and Scenes, vol. 1260, Feb. 15, 1990.

(List continued on next page.)

*Primary Examiner*—Chris Kelley
*Assistant Examiner*—Tung Vo
(74) *Attorney, Agent, or Firm*—Fish & Neave

(57) ABSTRACT

A video compression system is provided. An encoder may encode video that is decoded by a decoder. The video may be made up of video frames. The decoder may generate approximated display frames for viewing on a display device based on corrected reference frames. The corrected reference frames at the decoder may be created based on approximated reference frames generated based on model state information and based on difference frames provided by the encoder. The encoder may create the difference frames by subtracting approximated reference frames from exact reference frames. The exact reference frames may be created based on a model of a three-dimensional virtual reality environment. The encoder may create the approximated reference frames based on corrected reference frames that are generated based on the difference reference frames.

32 Claims, 9 Drawing Sheets

OTHER PUBLICATIONS

Ronald Azuma and Gary Bishop, "A Frequency–Domain Analysis of Head–Motion Prediction," Computer Graphics Proceedings, Aug. 6, 1995.

Thomas S. Huang et al., "Advances in Very Low Bit Rate Video Coding in North America,"IEICE Transactions on Communications, Oct. 10, 1996.

Yair Mann and Daniel Cohen–Or, "Selective Pixel Transmission for Navigating in Remote Virtual Environments, "Eurographics, Sep. 4, 1997.

Hirobumi Nishida, "A structural approach to representation of curved objects," Pattern Recognition, 1997.

* cited by examiner

MODEL-BASED VIEW EXTRAPOLATION FOR INTERACTIVE VIRTUAL REALITY SYSTEMS

This application claims the benefit of U.S. provisional application No. 60/147,419, filed Aug. 6, 1999, which is hereby incorporated by reference herein in its entirety.

BACKGROUND OF THE INVENTION

This invention relates to video compression techniques, and more particularly, to video compression techniques suitable for use with three-dimensional content such as three-dimensional virtual reality environments.

With the increasing popularity of network-based applications, compression of synthetic animation image sequences for efficient transmission is more important than ever. For long sequences, the latency time of downloading the compressed file may be prohibitive, even if the overall compression ratio is high. A better network-based compression scheme may involve partitioning the compressed sequence into two parts. The first part, or header, may be small enough to be downloaded within an acceptable initialization time, while the second part may be transmitted as a stream. The compressed data may be broken up into a stream of data that may be processed along the network pipeline—i.e., the compressed data may be transmitted from one end and received, decoded, and displayed at the other end. Streaming necessarily requires that all the pipeline stages operate in real time. Network bandwidth is the most constrained resource along the pipeline. The main challenge is therefore to reduce the stream bandwidth enough to accommodate the network bandwidth constraint.

Standard video compression techniques like MPEG, are generally insufficient for steaming in low-bandwidth environments. For example, average MPEG frames are typically about 2–6K bytes in size for moderate frame resolutions. Assuming a network with a sustained transfer rate of 2K bytes per second, a reasonable quality of a few frames per second cannot be achieved.

A significant improvement in compression ratio is still necessary for streaming video in real time.

It is an object of the present invention to provide improved video compression schemes.

It is a further object of the present invention to provide video compression schemes that allow high-quality content to be streamed over relatively low-bandwidth network connections.

SUMMARY OF THE INVENTION

In accordance with the present invention, a video compression system is provided.

The system may include a video source for providing video. The video source may be based on a real-life camera. For example, the video source may be a real-life camera that provides digital images and range or distance information. The video source may also involve the generation of animations or other three-dimensional virtual reality content. Such content may include, for example, a three-dimensional virtual world that is presented from the point-of-view of a user at a virtual camera position. Model and animation data may be provided by the video source. If desired, other suitable video capture or playback equipment may be used as the video source.

Video content from the video source may be encoded by an encoder and decoded by a decoder. Video decoded by the decoder may be presented to a user on a display device.

If desired, the encoder may be implemented on a server and the decoder may be implemented on a client. The server and client may communicate over a relatively low-bandwidth network connection (e.g., a standard dial-up modem connection on the Internet or the like). A user at the client may interact with the encoder in real time by providing user inputs (e.g., desired movements in the virtual reality environment) to the encoder over the network connection.

Further features of the invention, its nature and various advantages will be more apparent from the accompanying drawings and the following detailed description of the preferred embodiments.

BRIEF DESCRIPTION OF THE INVENTION

DETAILED DESCRIPTION OF THE PREFERRED EMBODIMENTS

Figure 1:
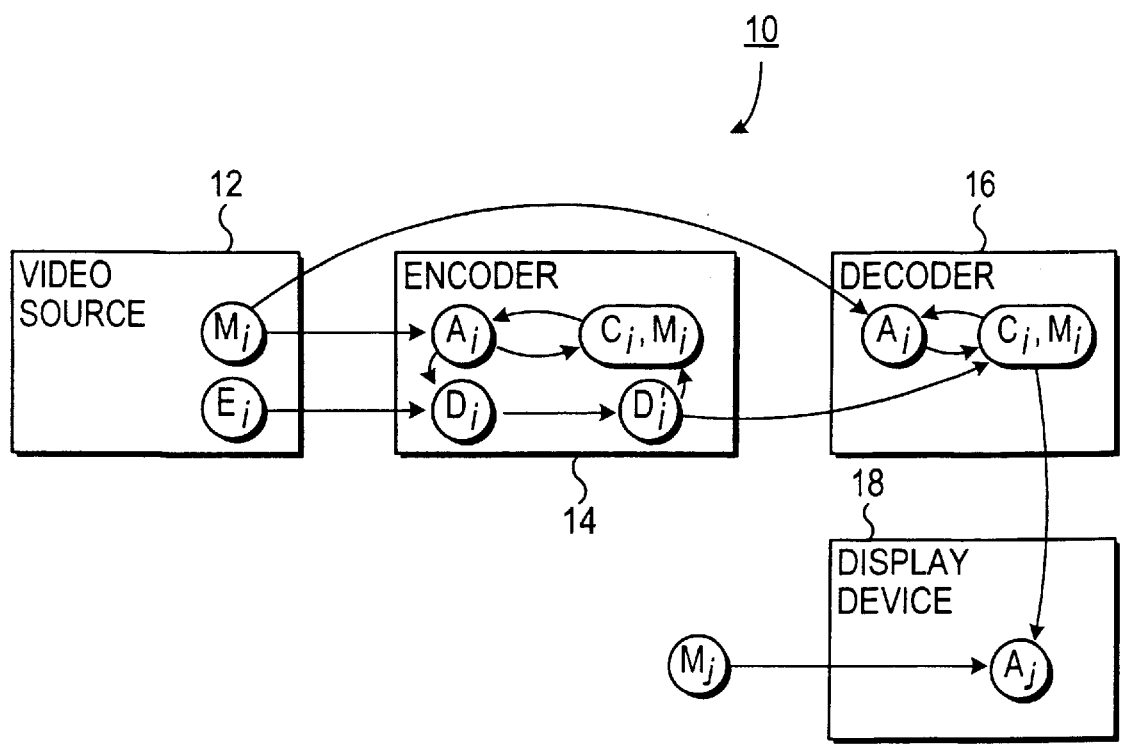
FIG. 1 is a schematic diagram of the video compression scheme in accordance with the present invention.

A diagram illustrating a system 10 that may be used to support video compression techniques in accordance with the present invention is shown in FIG. 1. System 10 may include a video source 12, an encoder 14, a decoder 16, and a display device 18. Video source 12 and encoder 14 may be implemented using one computer (e.g., a server) and decoder 16 and display device 18 may be implemented using another computer (e.g., a client). Video source 12, encoder 14, decoder 16, and display device 18 may also be implemented on a single computer or two or more computers that communicate with each other, but which do not use a client-server architecture.

Video may be supplied by video source 12. Video source 12 may be any suitable source of video. For example, video source 12 may provide video that is captured from a real-life video camera. Video source 12 may also provide video that is generated from an animation tool. For example, an animation tool may be used to create a three-dimensional virtual reality world that is described by a model M. The video provided by source 12 may include a sequence of video frames $E_i$, each of which corresponds to a different view of the virtual world. Each frame may correspond to a different state of the environment. For example, a user located at decoder 16 may be interacting with the virtual reality environment and each view may correspond to a different position of the user's point-of-view (e.g., a different position of a user's virtual camera within the virtual environment). Animated objects that appear in the user's field-of-view may also have different positions and appearances in different frames.

In order to reduce the bandwidth requirements for transmitting the video frames to decoder 16, decoder 16 may be used to estimate the frames being displayed on display 18 based on a relatively small number of transmitted reference frames and model information. Reference frames may either be selected from a video sequence or may represent a model state that neighbors the video sequence.

Initially, $C_0$, a compressed version of an initial exact frame $E_0$, and at least a portion of the modeling information sufficient for calculating the three-dimensional position at all elements in $E_0$ (e.g., modeling information $M_0$) may be transmitted to decoder 16.

Encoder 14 may approximate reference frame $A_1$ based on corrected reference frame $C_0$ and model information $M_0$ and based on model information $M_1$. Model information $M_i$ may be any information that provides a three-dimensional location for each point in the video frames $E_i$ (e.g., a polygonal model including animations or a Z-buffer).

The three-dimensional mapping used to create approximated views $A_i$ and $A_j$ may be based on a model-based back-projection technique. Model-based approaches are significantly better for exploiting inter-frame coherence than techniques such as MPEG. With the model-based approach, motion compensation (e.g., a two-dimensional mapping from the new approximated frame $A_1$ to reference frame $C_0$—also called back-projection) may be computed by client 22 and need not be transmitted to client 22 from server 20.

At video source 12, an exact reference frame $E_1$ may be created. For example, a rendering application or engine that is implemented on the computer equipment on which encoder 14 is located may be used to render frame $E_1$.

Rather than sending complete reference frames from encoder 14 to decoder 16, system 10 uses an arrangement in which difference reference frames $D_i$ or compressed difference reference frames $D_i'$ may be transmitted to decoder 16 from encoder 14.

The difference frames $D_i'$ may be compressed more than the reference views $E_i$, which reduces the amount of data that needs to be transmitted over the network. Moreover, the server 20 need only correct reference frames, which are constructed at a lower frequency than the display frames (e.g., 1/20th of the frequency).

At encoder 14, a difference frame, $D_1=E_1-A_1$ may be created based on the exact reference frame $E_1$ and the approximated reference frame $A_1$. If desired, difference frame $D_1$ may be compressed using JPEG compression or other lossy compression schemes or a lossless compression technique to produce compressed difference frame $D_1'$.

It is not necessary to include all pixels. Rather, pixels may be selected for transmission based on their "quality." For example, only pixels of high quality may be transmitted and other pixels may be discarded. High quality pixels may be defined as those with a high visibility (i.e., pixels that may fill holes or gaps or the like) and those with a high scaling factor (closeness). The use of quality criteria is described in more detail below.

As described in more detail below, a suitable packing scheme may be used before compressing difference frames such as difference frame $D_1$. For example, difference frames $D_i$ may be divided into sections that contain the pixels selected as described above. The remaining pixels may be discarded. The sections may be packed together and compressed when forming difference frame $D_i'$. Before using such a packed difference frame to generate a corrected reference view, the packed difference frame may be uncompressed and then unpacked.

If the difference frame is compressed using lossy compression before being transmitted to client 22, the corrected reference frames $C_i$ that are computed by client 22 will not be identical to the exact reference frames $E_i$. In this situation, server 20 may be used to calculate the corrected reference frames $C_i$, like client 22, by adding the compressed difference frames $D_i'$ to the approximated views $A_i$. This ensures that the state of client 22 is always available to server 20.

The unpacked difference reference view $D_1'$ may be used in encoder 14 to calculate a corrected reference frame $C_1$ based on the approximated frame $A_1$, because $C_1=A_1+D_1'$.

The corrected reference frame $C_1$ may then be used by encoder 14 to calculate an additional approximated reference frame $A_2$ based on model information $M_2$. The process may continue at encoder 14, with each successive compressed difference reference frame $D_i'$ being used to create a corresponding corrected reference frame $C_i$ and by creating approximated reference frames $A_i$ based on the preceding values of $C_0 \ldots C_{i-1}$ and $M_0 \ldots M_{i-1}$ and new modeling information $M_i$. Difference frames $D_i$ may be created based on exact reference frames $E_i$.

Similarly, when creating approximated frames $A_i$ and $A_j$, the source pixels being relied upon in the corrected reference frames $C_0 \ldots C_{i-1}$ may be chosen based on the quality of each pixel. In particular, pixels may be selected based on whether they are located on near objects or far objects. The nearness of pixels in a view is a criteria that may be referred to as closeness or scaling. Pixels may also be selected based on whether they are filling a hole or gap (e.g., based on their visibility). If desired, both scaling and visibility may be used to judge the quality of the pixels being used to create approximated views and difference views.

Figure 2:
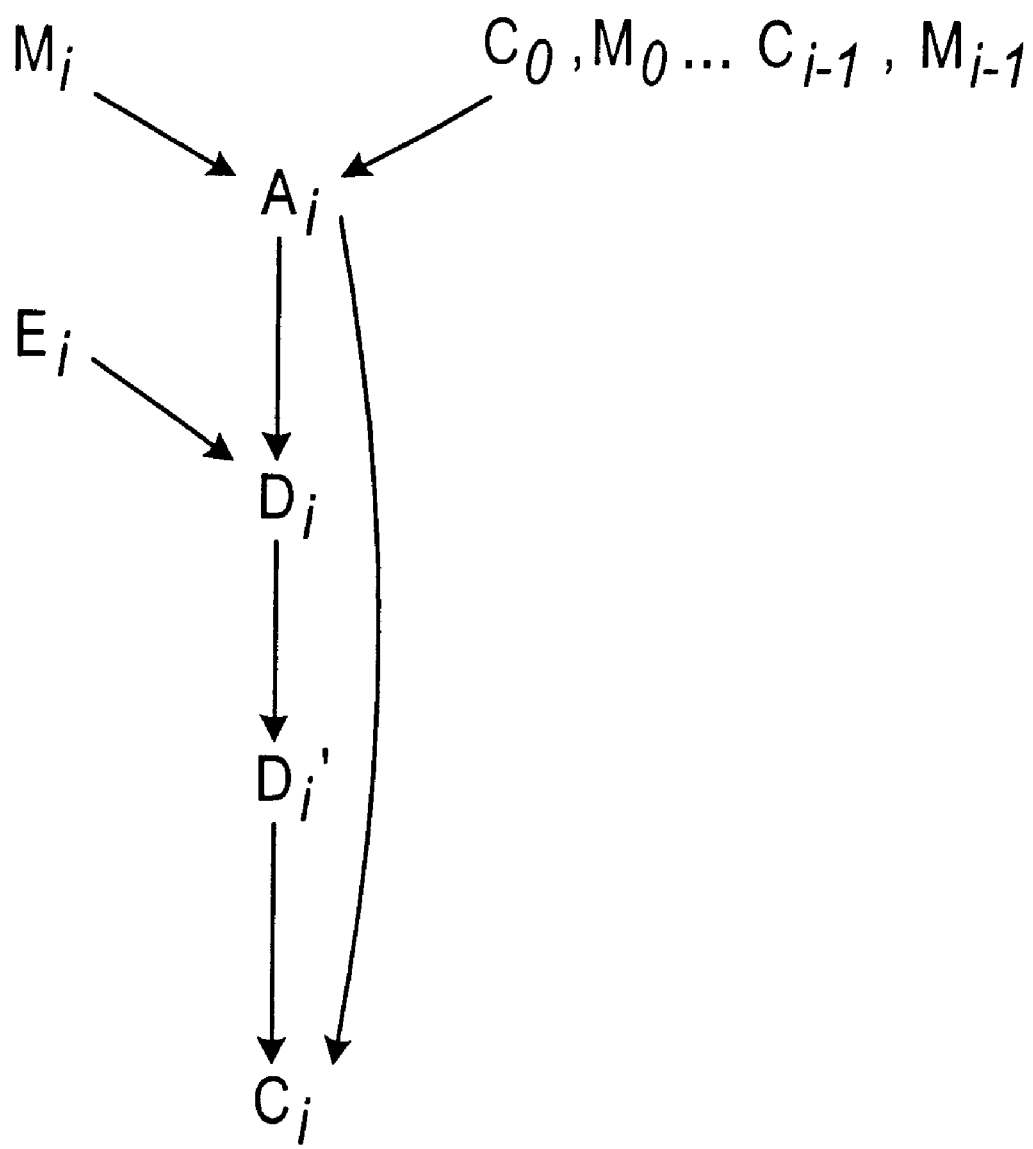
FIG. 2 shows an illustrative encoding process in accordance with the present invention.
Figure 3:
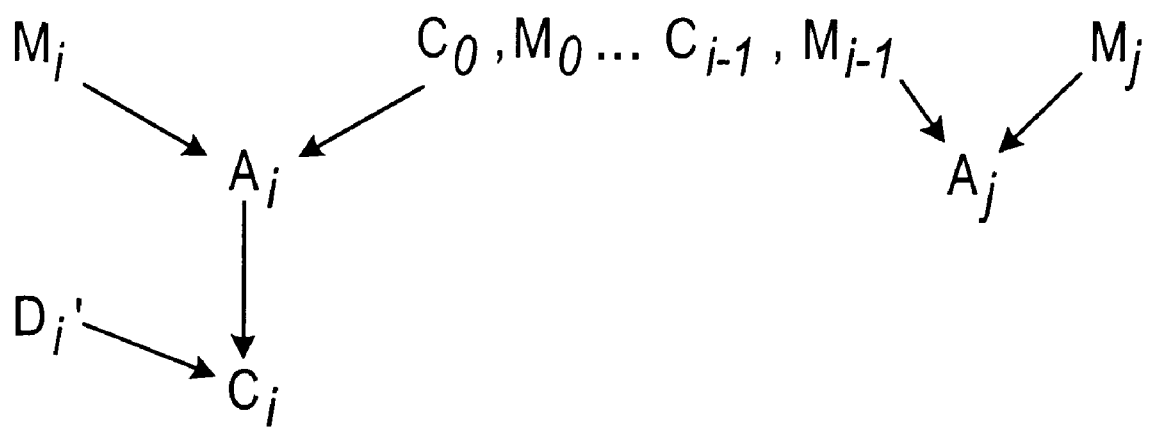
FIG. 3 shows an illustrative decoding process in accordance with the present invention.

With the arrangement of FIGS. 1–3, a scene's modeling data (e.g., three-dimensional and animation data) may used to approximate (interpolate) views from reference views using three-dimensional mapping. The mapped views may be constructed by dividing frames into sections. Each section of a frame may be based on an underlying geometric model. For each section of a frame being constructed, the reference frame to be used may be chosen from a pool of multiple reference frames according to quality criteria. Each frame section may be three-dimensionally mapped from a set of the selected reference frames. The set may be selected based on the quality criteria. This is described in more detail below.

On the decoder side, reference frames are constructed and corrected in the same way that reference frames are constructed and corrected at the encoder. Each approximated reference frame may be based on model state information $M_i$ from video source 12 and may be based on previous corrected reference frames $C_0 \ldots C_{i-1}$ and model information $M_0 \ldots M_{i-1}$. Difference frame $D_i'$ may be unpacked and used to correct approximated reference frames $A_i$, thereby producing a corrected reference frame $C_i$.

Corrected reference frames $C_0 \ldots C_{i-1}$ and model information $M_0 \ldots M_{i-1}$ may be used to estimate a series of approximated display frames $A_j$ based on model state information $M_j$. If desired, model state information $M_j$ may be based on user inputs.

If desired, model states $M_i$ may be selected for their suitability in generating reference frames. Model states $M_j$ and display frames $A_j$ are determined by the video sequence being displayed.

When decoder 16 creates approximated frames $A_i$ and $A_j$, the source pixels being relied upon in the corrected reference frames $C_0 \ldots C_{i-1}$ may be chosen based on the quality of each pixel.

The encoding process performed by encoder 14 is shown in more detail in FIG. 2. As shown in FIG. 2, model state $M_i$ may be combined with corrected reference frames $C_0$ through $C_{i-1}$ and model information $M_0 \ldots M_{i-1}$ to create an approximated reference frame $A_i$. Approximated reference frame $A_i$ may be subtracted from an exact reference frame $E_i$ to create difference reference frame $D_i$. Frame $E_i$ may be generated at video source 12. Difference reference frame $D_i$ may be compressed to create compressed difference reference frame $D_i'$.

The decoding process performed by decoder 16 is shown in more detail in FIG. 3. As shown in FIG. 3, model state $M_i$ may be combined with previous corrected reference frames $C_0$ through $C_{i-1}$ and model information $M_0 \ldots M_{i-1}$ to create approximated reference frame $A_i$. Compressed difference reference frame $D_i'$ may be used to correct approximated reference frame $A_i$ to create corrected reference frame $C_i$. Corrected reference frames $C_0 \ldots C_{i-1}$ and model information $M_0 \ldots M_{i-1}$ may be used to extrapolate approximated display frames $A_j$ based on model state information $M_j$.

Local scaling factors may be used as criteria for measuring the quality of three-dimensional mappings from a reference frame using a geometric model. The scaling factor may vary for each pixel in a constructed image and may be a measure of the amount of stretching involved a given mapping from a reference frame to an approximated frame. A high scaling factor may result in a blurred and therefore low-quality result. The scaling factor may be computed from the matrix norm 2 of the partial derivative matrix of the mapping at a certain pixel neighborhood.

Assume that the virtual reality environment is described by a polygonal geometric model, textures, and a number of light sources. Given a view (frame) and a set of view-dependent textures (corrected reference frames), it is desirable to select the highest quality texture for each visible polygon. The quality of the source texture is related to the area covered by the projection of each polygon in the source frame (corrected reference frames). Thus, a per polygon local scaling factor may be used to estimate the areas in the source texture that locally shrink or expand when mapped onto the source frame (corrected reference frame). When the scaling factor is less than or equal to one, the source frame may be considered to be adequate for generating a target frame. As the scaling factor increases above 1, more and more blurriness appears in the target images, so the source texture may be considered to be less and less adequate. This per polygon texture quality factor may be used to select the best source texture out of the available set of view-dependent textures (corrected reference frames). If the best source is above a predetermined threshold, a new texture (corrected reference frame) may be required. However, a successful streaming of the textures may guarantee that there will always be one available texture whose quality factory is satisfactory.

The maximal value of the scaling factor in a particular polygon in the source frame may be estimated for a given target frame (approximated reference frame $A_i$). The scaling factor may be defined independently of the visibility of the polygon. The polygon may be mapped from the source to the target by a linear transformation or a non-linear transformation.

In the linear case, let A be a square matrix corresponding to a linear transformation. The scaling factor of a linear transformation is the 2-norm of the matrix A, i.e., the maximum 2-norm of Av over all unit vectors v.

$$\max \|Av\|_2$$
$$\|v\|_2 = 1$$

It can be shown that the 2-norm of A equals the square root of $\lambda_{max}$, the largest eigenvalue of $A^T A$. In the case of two-dimensional linear transformations, where A is a 2 by 2 matrix, a closed-form expression for $\lambda_{max}$ may be provided. Let $a_{ij}$ denote the elements of A and $e_{ij}$ the elements of $A^T A$:

$$A = \begin{pmatrix} a_{11} & a_{12} \\ a_{21} & a_{22} \end{pmatrix} \quad A^T A = \begin{pmatrix} e_{11} & e_{12} \\ e_{21} & e_{22} \end{pmatrix} \qquad (1)$$

The eigenvalues of the matrix $A^T A$ are the roots of the polynomial $\det(A^T A - \lambda I)$, where I is the identity matrix. In the two-dimensional case, $\lambda_{max}$ is the largest root of the quadratic equation $$(e_{11} - \lambda)(e_{22} - \lambda) - e_{12} e_{21} = 0. \qquad (2)$$

Thus, $$\lambda_{max} = \frac{e_{11} + e_{22} + \sqrt{(e_{11} + e_{22})^2 - 4(e_{11} e_{22} - e_{12} e_{21})}}{2} \qquad (3)$$

Expressing the elements $e_{ij}$ in terms of the elements $a_{ij}$ yields $$A^T A = \begin{pmatrix} a_{11}^2 + a_{21}^2 & a_{11} a_{12} + a_{21} a_{22} \\ a_{11} a_{12} + a_{21} a_{22} & a_{12}^2 + a_{22}^2 \end{pmatrix} \qquad (4)$$

and finally, defining $S = \frac{1}{2}(a_{11}^2 + a_{12}^2 + a_{21}^2 + a_{22}^2)$, yields $$\lambda_{max} = S + \sqrt{S^2 - (a_{11} a_{22} - a_{12} a_{21})^2} \qquad (5)$$

Handling non-linear transformations, such as projective transformations, requires measuring the scale factor locally at a specific point in the image by using the partial derivatives of the transformation at that specific point. The partial derivatives may be used as the coefficients of a linear transformation.

The source and target image coordinates of a point may be denoted by $x_0$, $y_0$, and $x_1, y_1$ respectively. The three-dimensional location of that point in target camera coordinates may be denoted by x, y, z. This gives:

$$(x, y, z)^T = \begin{pmatrix} a & b & c \\ d & e & f \\ g & h & i \end{pmatrix} (x_0, y_0, 1)^T \qquad (6)$$

$$(x_1, y_1)^T = \frac{1}{z}(x, y)^T \qquad (7)$$

or explicitly, $$x_1 = \frac{ax_0 + by_0 + c}{gx_0 + hy_0 + i} \quad (8)$$

$$y_1 = \frac{dx_0 + ey_0 + f}{gx_0 + hy_0 + i}$$

The partial derivatives of the above mapping at $(x_1, y_1)$ define its gradient, which is a linear transformation:

$$A = \begin{pmatrix} \partial x_1/\partial x_0 & \partial x_1/\partial y_0 \\ \partial y_1/\partial x_0 & \partial y_1/\partial y_0 \end{pmatrix} = \frac{1}{z^2}\begin{pmatrix} za - x_1 g & zb - x_1 h \\ zd - y_1 g & ze - y_1 h \end{pmatrix} \quad (9)$$

In cases where the field of view is small, and there is only a little rotation of the plane relative to the source and target views, the following approximation can be used. The transformation of the plane points from source to target image can be approximated by:

$$x_1 = a + bx_0 + cy_0 + gx_0^2 + hx_0 y_0$$

$$y_1 = d + ex_0 + fy_0 + gx_0 y_0 + hy_0^2$$

This is called a pseudo 2D projective transformation and results in:

$$A = \begin{pmatrix} b + 2gx_0 + hy_0 & c + hx_0 \\ e + gy_0 & f + gx_0 + 2hy_0 \end{pmatrix} \quad (11)$$

To estimate the maximal scaling factor, the gradient can be computed at the three vertices of a triangle. In cases where the triangle is small enough, even one sample (at the center of the triangle) can yield a good approximation.

Image-based rendering techniques including the techniques of the present invention, may exhibit artifacts such as holes and overlaps due to mappings between frames that are non one-to-one functions. Holes, referred to as visibility gaps, are areas of the approximated frame that are not covered by the reference view. Overlaps are areas in the approximated frame that are mapped by more than one area in the reference. Overlaps may be prevented using depth values to determine the presence of hidden surfaces. Holes may be more handled using multiple reference frames, as described below.

Another suitable quality criteria that may be used in addition to the scaling factor is visibility. Visibility gaps are areas visible in the approximated frames that are not visible in the associated reference frames. Pixels in the approximated frames that reside in visibility gaps may be considered to have an extremely low quality when mapped from the reference frame. Pixels in gaps are usually hidden behind closer objects in the reference frame or are outside of the viewing frustrum.

If desired, a combination of both the scaling factor and visibility criteria may be used to determine the quality of three-dimensional mappings from a reference frame. A pixel, which is invisible in the reference frame $(C_i)$ may receive the lowest quality value. The quality of pixels that are visible may be determined by the scaling factor. Computational effort may be minimized by dividing a frame into small patches. The scaling factor may be computed at the center of each patch and given to all pixels in the patch. A convenient method of partitioning the images into patches is to use the underlying three-dimensional model. The projection of each polygon in the constructed image may be considered to be a separate patch and the projection of each polygon may include the visibility of the pixel in the reference and the local scaling factor.

If desired, a wider field-of-view (FOV) may be used for reference frames $(C_i)$ than the display field-of-view presented to the client-side user. A wider reference field-of-view may prevent holes around the edges of the three-dimensionally mapped frame caused by a change in the virtual camera viewing angle between two reference frames.

Figure 5:
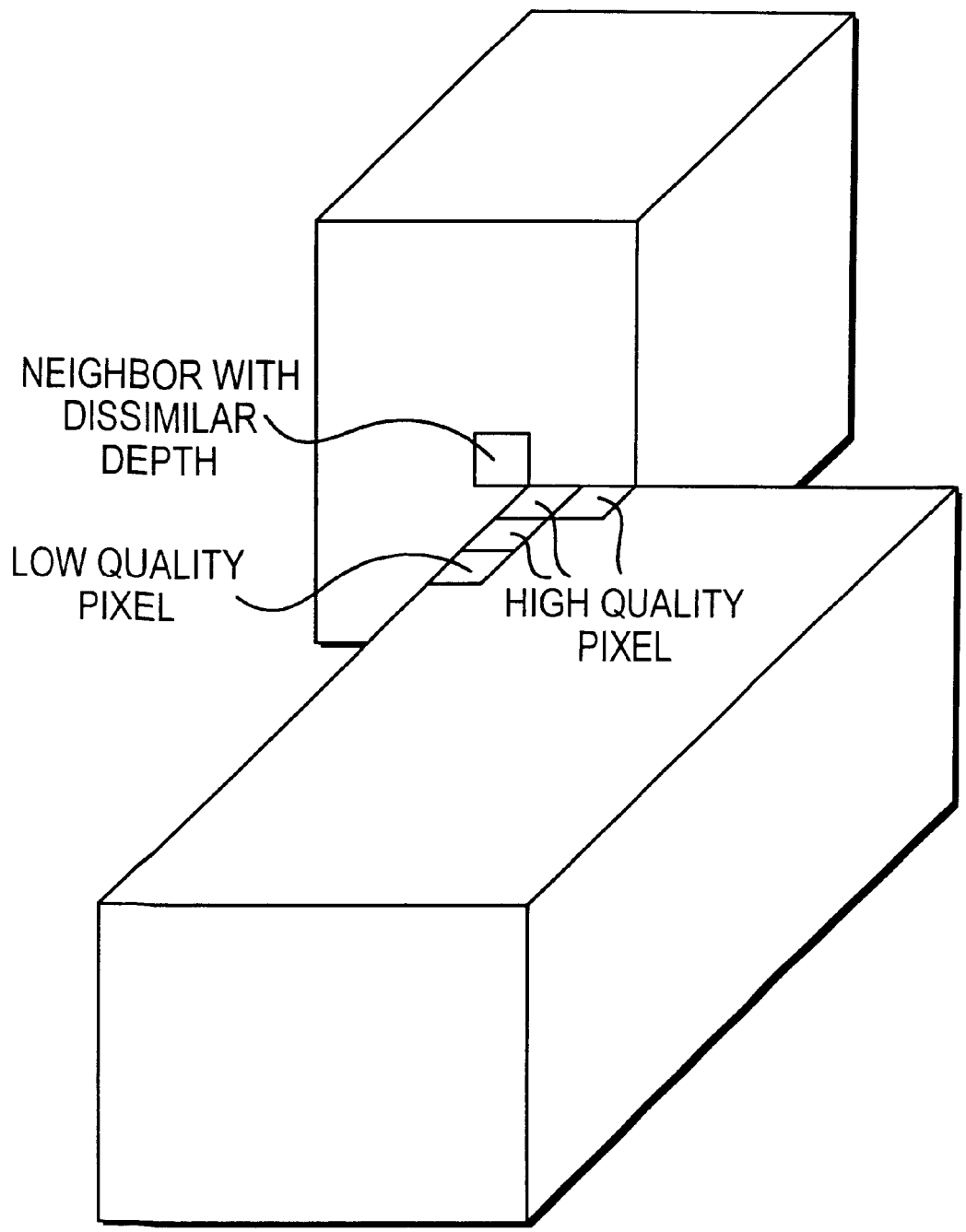
FIG. 5 is a diagram showing how neighboring pixels with dissimilar depth need not be included in a weighted average that uses the values of adjacent high-quality pixels to estimate the value of a low quality pixel in accordance with the present invention.

Another approach involves locating low quality pixels in the approximated frame and approximating them based on the values of high quality neighbors. This approach may be used in combination with approaches based on multiple reference frames or wider reference fields-of-view. If desired, a requirement for similar depth values may be used to ensure that neighboring pixels belong to the same surface as the approximated pixel. A weighted average for the texture (or color or red-green-blue or RGB) values may be computed for all such neighbors. The weights that are used may be the inverse of the distance between the neighbor and the approximated pixel. As shown in FIG. 5, with this approach, values from nearby high-quality pixels may be included in the weighted average, but neighbors with dissimilar depths that are therefore not part of the same surface as the low quality pixel are excluded.

Figure 6:
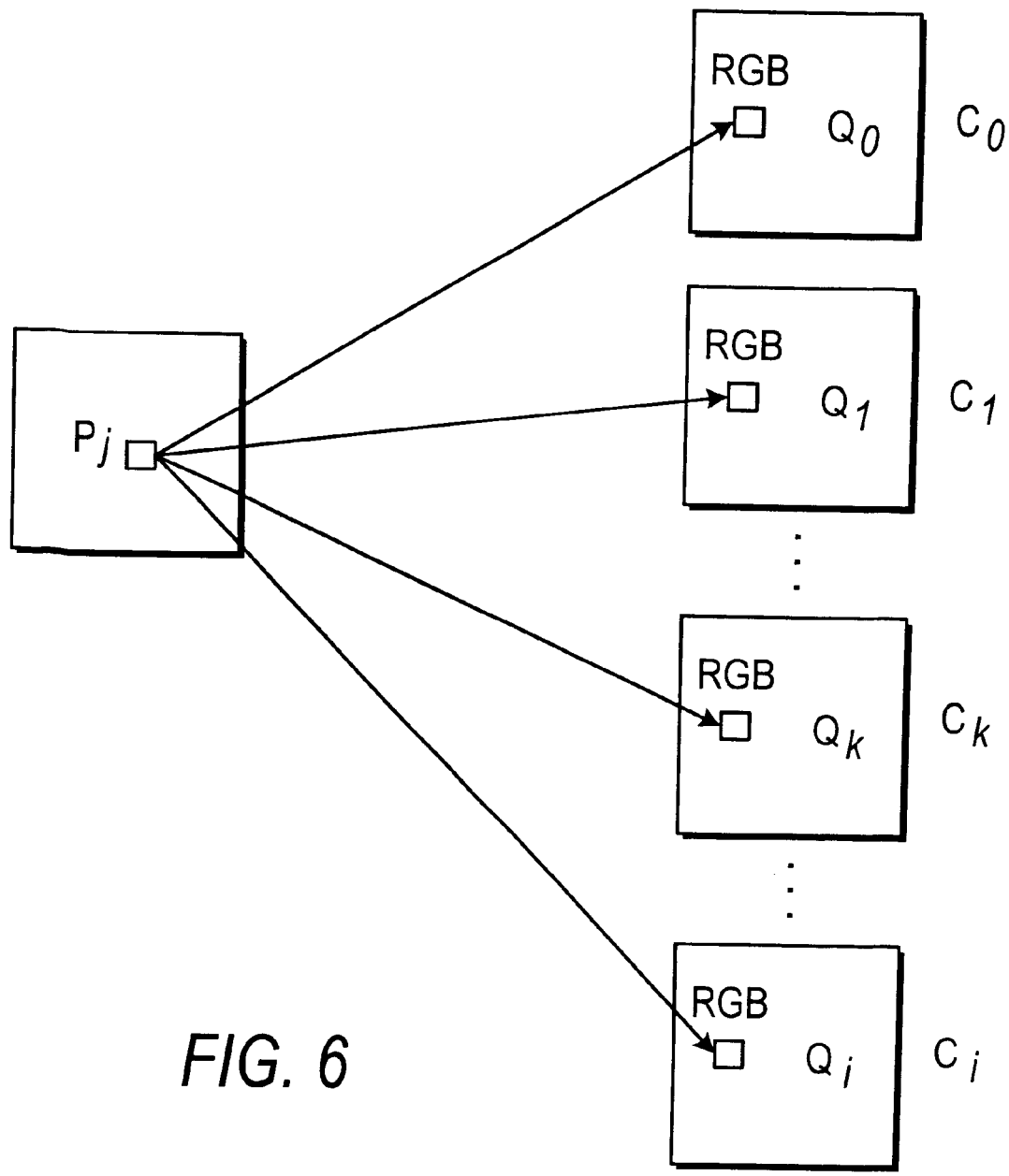
FIG. 6 is a diagram showing how a pixel may include contributions from pixels in multiple reference frames in accordance with the present invention.

As shown in FIG. 6, a plurality of available reference frames $(C_0–C_i)$ may be used to three-dimensionally map a new approximated frame A. A pool of available corrected reference frames $(C_0–C_i)$ may be selected. For each pixel, $P_j$, in the approximated frame A, the qualities $(Q_0–Q_i)$ of all three-dimensional mappings to the pool reference frames $(C_0–C_i)$ may be computed according to chosen criteria (e.g., visibility and scaling). The reference frame $C_k$ having the highest quality value $Q_k$ may be chosen as the source for the pixel $P_j$. If desired, more than one reference frame may be used as a source for the pixel and blended using the quality values $Q_0–Q_i$ as weights in a weighted average. This may ensure that the mapping of the pixel is smooth relative to the frame A for the new point-of-view.

The quality criteria may also be used to reduce bandwidth requirements. The quality associated with the three-dimensional mapping of each pixel in the approximated frame may be computed regardless of the number of reference frames used. Pixels that have been mapped with a high quality may be omitted from the difference frame to save bandwidth.

A further bandwidth reduction may be achieved by using a packing algorithm for the remaining pixels. A suitable packing algorithm is described in Y. Mann et al., "Selective Pixel Transmission for Navigating in Remote Virtual Environments," (Eurographics 97). The packing algorithm rearranges the remaining (low quality) difference frame pixels into a smaller rectangular area, while maintaining correlation among neighboring pixels. A packed image may be compressed significantly better than an unpacked image when using lossy techniques such as JPEG. Pixels omitted from the residual are not corrected in the corrected reference frame. These pixels contain no additional information relative to their source reference frames. Accordingly, such pixels are not marked to be used as a source for subsequent three-dimensional mappings, at least while their source reference frames are available for three-dimensional mappings.

The approximated view A may be constructed by back-projecting. Back-projecting may be used with a polygonal model. Because the correspondence between two perspective views is a projective map, the model may be rendered by applying a projective mapping rather than a perspective mapping. This projective map can be expressed by a linear transformation in homogenous space and can be implemented by rational linear interpolation, which requires divisions at each pixel.

Figure 7:
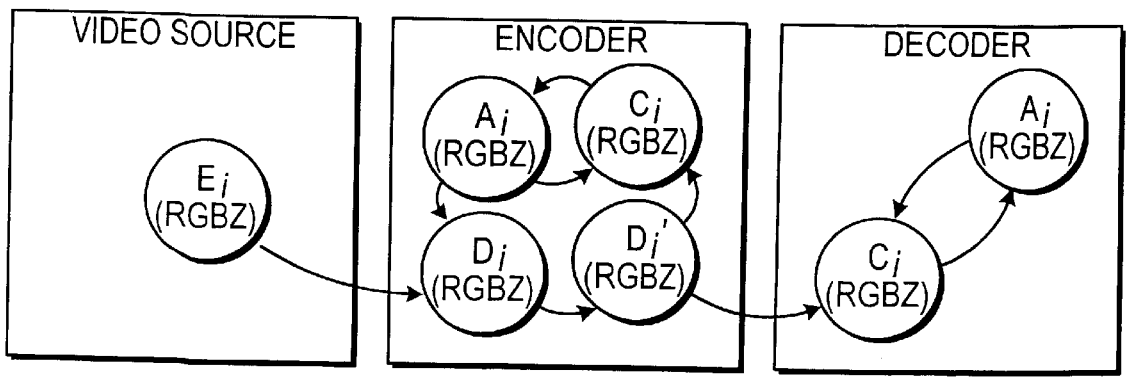
FIG. 7 is a diagram of an illustrative video compression process that uses depth information (Z) in accordance with the present invention.

An alternative to the inclusion of the geometric model in the data set involves treating depth data (also known as Z-buffer data or data on the distance from the optical plane at the real or virtual camera at the user's point-of-view) as another image band in addition to the standard color bands (RGB bands). The Z-band may be approximated by mapping the Z-band from corrected reference frames using a three-dimensional mapping. The Z-band's residual may be computed and included in the data set, as shown in FIG. 7. Because of the addition of the depth band, the exact reference frame $E_i$, the approximated reference frames $A_i$, the difference frames $D_i$ and $D_i'$, and the corrected reference frames $C_i$ include both RGB data for color information and Z data for depth information. No separate model state information ($M_i$) is necessary with this scheme, because the mappings may be calculated from the embedded depth information. A Z-buffer residual may be efficiently compressed using an algorithm with direction encoding, as described by B. K. Guenter et al. in "Motion Compensated Compression of Computer Animation Frames" in Computer Graphics Proceedings, Annual Conference Series, 1993. When a Z-buffer is used instead of a geometric model, however, fast scan-line algorithms may not be used. Rather, pixels need to be forward-mapped from the source and smeared in the target image to prevent holes. Ray tracing algorithms may also be used. Such solutions are generally slower and more complex than scan-line algorithms.

A data set that includes model state information (e.g., geometric and animation data) and difference frames may be transmitted from encoder 14 to decoder 16. The data set may be compressed and packed. The data set may be streamed to decoder 14 as needed based on user inputs (e.g., based on a user's virtual point-of-view when navigating through a virtual world) and based on animation requirements (e.g., based on requirements that certain objects in the virtual reality world are moving or changing and are not static when viewed by the user).

Additional aspects of the invention may be understood with reference to the following illustrative examples.

Real-time Interactive Client-Server System

Figure 4:
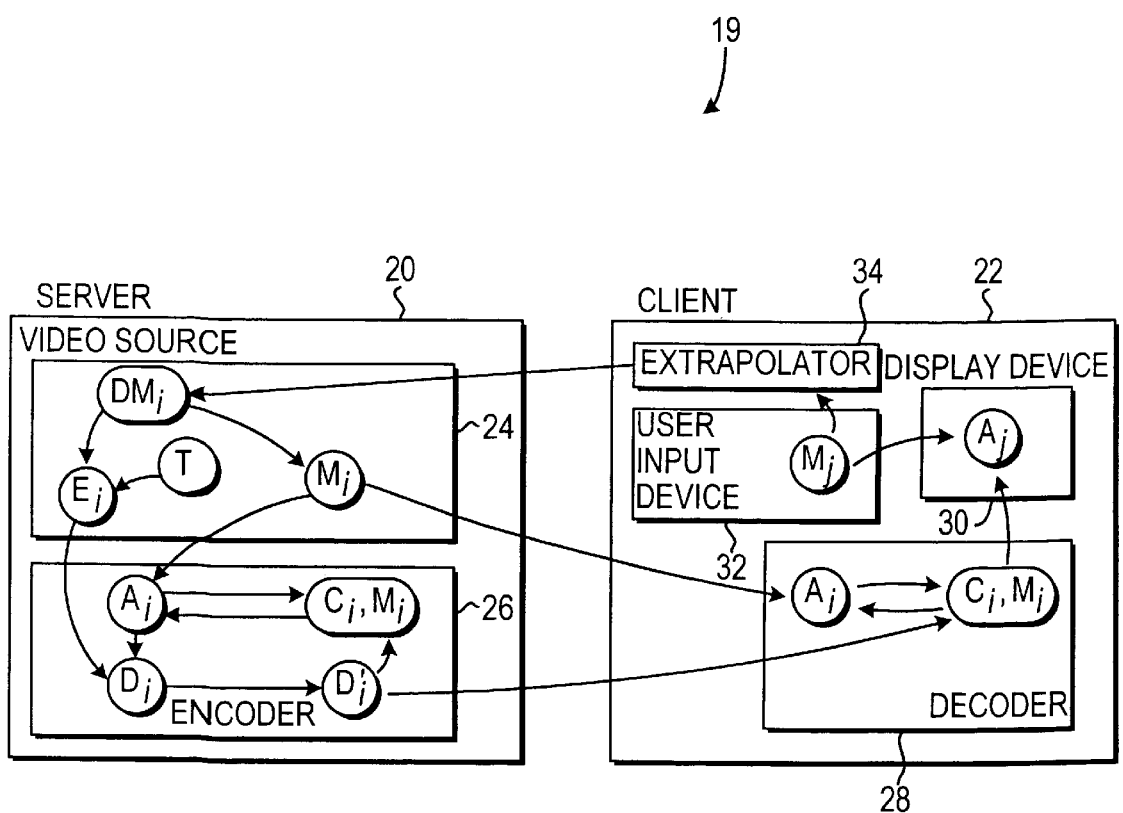
FIG. 4 is a schematic diagram of an illustrative embodiment of a client-server video compression arrangement that supports real-time interactivity for a user in accordance with the present invention.

A real-time interactive client-server system 19 is shown in FIG. 4. Video is generated on a server 20 and provided to a client 22 over a network. The network may be, for example, a relatively low-bandwidth network such as the Internet as accessed by conventional dial-up modems or the like.

The user may roam in a virtual reality environment that is presented to the user on display device 30. The user may navigate using any suitable user input device 32, such as a mouse, trackball, joystick, keyboard, touch pad, touch screen, etc.

Client 22 may send a camera point-of-view (user input) to server 20 at fixed intervals (e.g., at a frequency of once per second). In response, server 20 may use detailed model information $DM_i$ and texture information T to render an exact frames $E_i$ using the camera position information as shown in FIG. 4. Server 20 may generate a difference frame $D_i'$ and may immediately transmit frame $D_i'$ to client 22. An advantage of the arrangement of FIG. 4 is that it places few computational requirements on server 20, because difference frames $D_i'$ need only be rendered at a relatively low frequency.

Detailed model state information $DM_i$ may be used by video source 24 of server 20 to render exact frames (views) $E_i$ of the virtual reality environment. The frames may correspond to model states that include information on the user's virtual camera point-of-view and the state of any animation in the virtual environment (e.g., the position of a moving object in the user's field-of-view). The camera point-of-view information may be transmitted from the user input device 32. If desired, an extrapolator 34 may be used to extrapolate from the user's current position and the extrapolated information sent to video source 24 for use in generating frames. Texture information T may also be used by video source 24 when rendering frames $E_i$.

Initially, client 22 may transmit an initial point-of-view (user input) to video source 24. Video source 24 may render an exact reference frame $E_0$ for the initial point-of-view. Video source 24 may send frame $E_0$ to client 22 accompanied by the portion of the simplified three-dimensional model ($M_0$) that is needed for that point of view.

After initialization, the user may navigate through the virtual reality world by entering coordinates of new points-of-view (user inputs). Client 22 may use three-dimensional mapping to create display frames based on the user inputs (i.e., based on the user's point-of-view information). The user inputs may be transmitted from client 22 to server 20 periodically (e.g., once per second, etc.). If desired, client 22 may use an extrapolator 34 to approximate a future point-of-view using a linear or higher-order extrapolation of the user point-of-view. Approximating future points-of-view in this way may help to reduce areas in the three-dimensionally mapped frames that are not covered by available reference views. After receiving the extrapolated point-of-view information from extrapolator 34, server 20 may use three-dimensional mapping to create a corresponding approximated reference view $A_i$ that is identical to the one generated by client 22. Server 20 may then render an exact reference view $E_i$ for the extrapolated point-of-view using its fully textured high-detailed model (T, $DM_i$). Subtracting the approximated frame ($A_i$) from the exact frame ($E_i$) creates difference frame information that may be transmitted to client 22.

After rendering an exact reference frame $E_i$, encoder 26 may generate a data set that is transmitted to client 22 over the communications network (e.g., over the Internet).

Decoder 28 may generate a new corrected reference frame $C_i$. Reference frames $C_0 \ldots C_{i-1}$ and model information $M_0 \ldots M_{i-1}$ may be combined with the locally-available data $M_i$ to construct subsequent approximated reference frame $A_i$. Because the reference frame $A_i$ that is constructed by decoder 28 is only an approximation, the data set provided to the client may include a difference (residual) frame $D_i'$ that is used to generate a corrected reference frame $C_i$.

Difference frames represent the difference between the approximated reference frames $A_i$ and the exact reference views $E_i$ that are rendered by the server 20.

At client 22, approximated display frames $A_j$ may be generated by three-dimensional mapping of corrected reference frames $C_0 \ldots C_{i-1}$ and model information $M_0 \ldots M_{i-1}$. The camera positions or any other user-controlled parameter for model state $M_j$ may be determined in real time using user inputs from user input device 32. This allows display frames $A_j$ to be displayed on display device 30 without latency. Latency may be avoided due to the decoupling between the construction of display frames $A_j$ and the data set produced by encoder 26. The server 20 need only transmit sufficient information to client 22 to maintain a pool of corrected reference frames ($C_0 \ldots C_{i-1}$) and associated model information $M_0 \ldots M_{i-1}$ on client 22 with camera positions sufficiently close to those used for display frames $A_j$ to ensure the availability of high-quality sources for the three-dimensional mapping between frames $C_0 \ldots C_{i-1}$ and frames $A_j$.

If desired, simplified model state information $M_i$ may be transmitted to client 22 from server 20, rather than detailed model state information $DM_i$. The virtual reality environment may include textured model information (i.e., detailed model $DM_i$ and textures T) stored at server 20. The transmitted model (i.e., simplified model state information $M_i$) need only include geometry and animation information, but not textures. This may result in a substantial reduction in the bandwidth required to transmit model state information from server 20 to client 22, because texture-space information may be significantly larger than geometry space information for a many virtual reality environments.

Server 20 need only transmit model data $M_i$ when new models enter the user's viewing frustrum or when a new level of detail is required for an existing model. The transmitted model may be losslessly compressed or may be compressed using lossy compression. So long as model $M_i$ is sufficient for calculating the necessary three-dimensional mappings, the transmitted model information $(M_i)$ may be a simplified version of the true model $(DM_i)$. The animation information to be applied to the model in the time and space visible to the user at the client 22 may be included in model information $M_i$. If desired, this animation information may be losslessly compressed, may be compressed using lossy compression, or may be approximated.

Computer-Generated Video Compression

A synthetic (computer-generated) video compression scheme may be used in which encoder 14 of FIG. 1 prepares a file offline that is to be decoded later by decoder 16 (FIG. 1) and displayed on display device 18. A client-server arrangement need not be used to play back video—a non-client-server system may be used. If desired, the encoder 14 and decoder 16 may reside on the same computer.

The three-dimensional model of the rendered scene and video frames, which may be generated by a three-dimensional animation tool such as 3D Studio Max or LightWave. Frames in the video sequence are also associated with model states $M_j$, which include a camera point-of-view and animation data.

Encoder 14 may choose reference frames out of the video sequence or reference frames that represent a model state that neighbors the video sequence. References may be sampled from the sequence at a frequency lower than the video display rate. Encoder 14 may prepare a data set containing residuals (difference frames) for each of the reference frames. The residuals describe the difference between the exact reference view and an approximated reference view which is three-dimensionally mapped from previous corrected references. Each reference data set may also contain the three-dimensional model parts and animation needed for the approximation of the reference view. Because the user does not supply any inputs, the data set must contain the camera point-of-view information for each frame in the video sequence including the reference frames.

Decoder 16, reading the reference data set file, may reconstruct the reference views. Approximated reference views $A_i$ may be approximated by three-dimensional mapping from previously corrected reference views $C_0 \ldots C_i$ and model information $M_0 \ldots M_{i-1}$. The approximated reference views may each be combined with a residual (difference frame) $D_i'$ to arrive at a corrected reference view $C_i$. Once the entire set of corrected reference views $C_i$ is reconstructed, the decoder 16 may proceed to reconstruct the entire sequence of video frames $A_j$ for display based on model states $M_j$. Model states $M_j$ describe the states of the model and the camera for each frame of the video sequence. Decoder 16 may use the entire set of corrected reference views $C_0 \ldots C_i$ and model information $M_0 \ldots M_{i-1}$ to 3D-map each frame in the video sequence. "Holes" in the 3D-mapping are rare, because decoder 16 uses future three-dimensionally mapped reference frames as well as past three-dimensionally mapped reference frames. The number of low quality pixels in the three-dimensional mapping that need to be approximated from their neighboring pixels is therefore low.

This non-interactive scheme may also be used for the compression of real-life video sequences (i.e., video that is not computer generated). For example, available photogrametric methods for extracting a 3D-model and animation of a scene from a video sequence, can be used. If desired, depth data (Z-buffer data) may be included in the data set instead of using a three-dimensional model. Real-life video cameras that have range scanners may be used to generate data for this compression scheme.

The compressed data set generated by the encoder 14 in this scheme may be streamed. Streaming is important for broadcasting video over the Internet or for viewing video sequences over the Internet that are more than a few seconds long. Each reference frame may be reconstructed before any data for subsequent reference frames is read by decoder 16. Due to the streaming environment, the entire set reference frames will not be available for generating non-reference frames. If desired, however, the three-dimensional mapping of a given video frame may be delayed until one or two (or more) reference views from the future have been reconstructed. This technique alleviates most of the artifacts associated with "holes" in the three-dimensional mapping, while supporting a streaming environment.

Figure 8A:
FIG. 8 is a diagram illustrating the use of future reference frames during reconstruction of compressed video in accordance with the present invention.
Figure 8B:
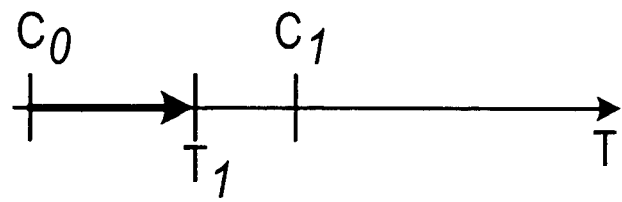
Figure 8C:
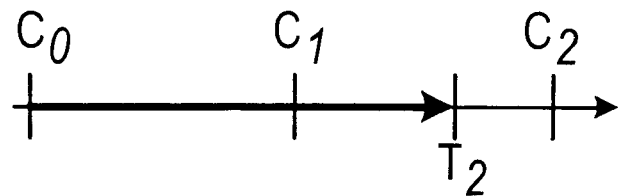

This playback approach is illustrated in FIGS. 8a, 8b, and 8c. In FIG. 8a, frame $C_0$ has been reconstructed at the client. In FIG. 8b, frames $C_0$ and $C_1$ have been reconstructed and therefore playback has been initiated and frames are currently being played at time $t_1$, which is between $C_0$ and $C_1$. In FIG. 8c, frame $C_2$ has been reconstructed and playback has advanced to time $t_2$.

Client-Server System Based on Offline Data Sets

An interactive client-server web system may be provided in which the client-side user roams in a remote virtual reality environment held in the server, but in which the server does not render views of the environment or encode a data set online. Instead, an encoder prepares numerous data sets offline, each of which corresponds to a short walkthrough in the environment. These data sets may be stored in a database residing on the server. The user may navigate in the virtual reality environment by choosing from the prepared walkthroughs (e.g., by clicking on on-screen signs or other options). The appropriate walkthrough may then be extracted by the server from the database and streamed to the client and displayed for the user.

Although this method somewhat restricts the interactive possibilities of the user, it requires significantly lower computing and graphic server capabilities than a fully-interactive approach. The server may be, for example, a relatively simple HTTP file server that is capable of simultaneously serving hundreds or thousands of clients using a standard personal computer hardware platform.

Figure 9:
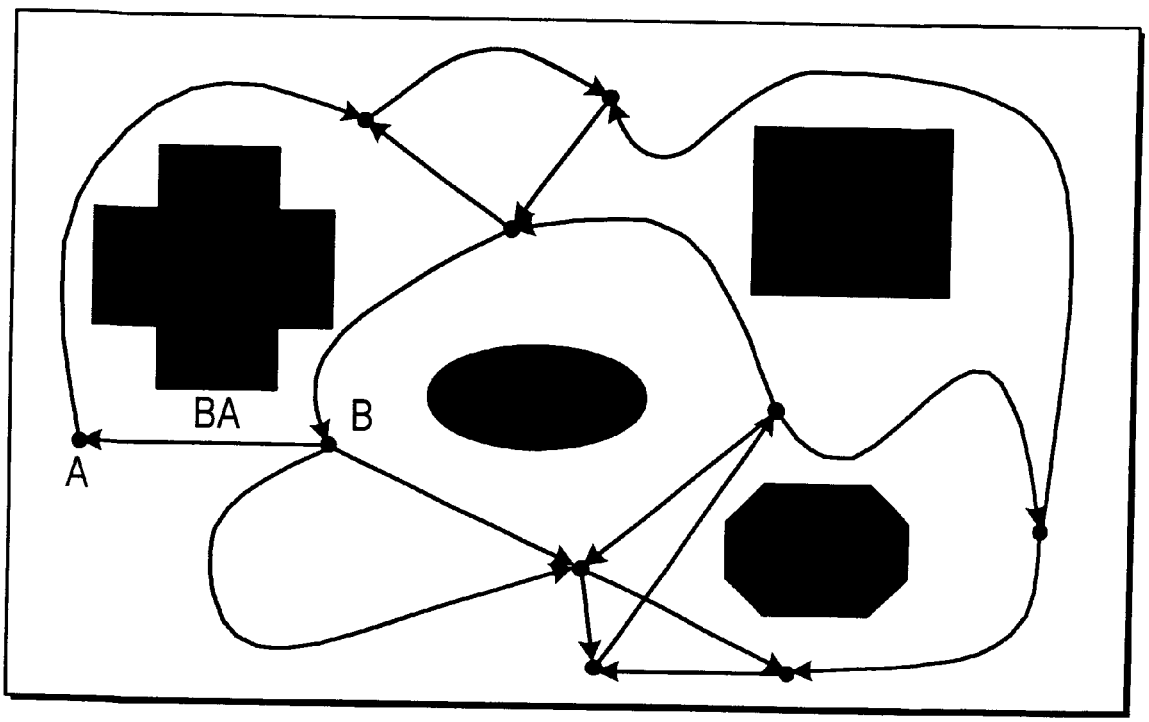
FIG. 9 is a diagram of an illustrative navigation graph in accordance with the present invention.

The short walkthroughs prepared by the encoder may define the edges of a directional graph that covers all areas in the virtual reality environment that are of potential interest to the user. A number of walkthroughs may end in the same single view (e.g., an exact reference frame). This view may also be the first view of a number of different walkthroughs. Such a view defines a vertex in the graph and may also be referred to as a junction. Between junctions, multiple reference frames (e.g., multiple exact reference frames, corrected reference frames, difference reference frames, and approximated reference frames) may be associated with each edge. Walkthroughs ending and starting at a specific junction are, respectively, the incoming edges and outgoing edges of that vertex. The user navigates by choosing a path in the directional graph, which is made up of seamlessly concatenated walkthroughs. FIG. 9 is a graphic representation of an illustrative navigational graph of this type. The short walkthrough BA is outgoing from junction B and incoming to junction A.

A convenient user interface for navigation inside a walkthrough graph involves using hotspots on the video frame. For example, clicking on a sign saying "dining room" will direct the server to stream a walkthrough to the client that takes the user towards a virtual dining room in the virtual reality environment. If desired, navigation buttons such as "turn left" or "turn right" may be provided. By selecting such a button while at a certain junction, the user may choose a preencoded walkthrough from the available outgoing walkthroughs from that junction. For example, when the user selects the turn left option, a video sequence for a left turn may be provided.

Each individual walkthrough may be encoded and a data set prepared using the approaches described above in connection with computer-generated video compression techniques. The first and last views of each walkthrough (the vertices of the graph) may always be chosen as reference views. If desired, other views in each walkthrough may be chosen as references, e.g., by sampling the walkthrough views at a frequency lower than the display rate.

The first reference view of a walkthrough is usually also the last reference of a previously displayed walkthrough. In these cases the data associated with the first reference can be omitted from the data set. Additionally, all parts of the geometric model needed for the first reference may already reside at the client side and may therefore be omitted from the data set.

With this type of arrangement, real-world video sequences can be used as described above in connection with computer-generated video compression. However, it may be desirable to give special attention to ensuring that walkthroughs end and begin at nearly the exact same view. For example, real-life cameras may be mounted on physical tracks or the like so that they may travel the same paths of the graph through which the user will navigate in the virtual reality environment.

If desired, more interactivity may be supported to enable the user to roam around (and not simply on) the predefined path prepared by the encoder. This may be accomplished because the views that are three-dimensionally mapped for display on the client side need not be only reference views (i.e., the model states $M_j$ of FIG. 1 need not be located on the same path as the reference model states $M_i$ and may vary in viewing angles, etc.). Typically, most of the reconstructed views will not be reference views. If the user is allowed to change the camera viewing angle as well as its position, than the field-of-view of the reference frames is preferably much wider than the field-of-view displayed to the user. In the relatively extreme case in which the user may freely choose any viewing angle, the field-of-view for each reference is preferably 360 degrees (i.e., a panorama).

Although the examples described herein use a difference image as a correction data set, other types of correction data sets may be used instead of a difference image or in addition to a difference image.

The three-dimensional models described herein may generally be formed using primitives such as polygons and textures. If desired, other methods of representing a three-dimensional environment may be used such as voxels, nurbs, etc.

Moreover, different quality criteria may be used when three-dimensionally mapping a pixel or a group of pixels. For example, the ratio between the areas a certain patch covers in source versus target views may be used as a quality criteria.

The foregoing is merely illustrative of the principles of this invention and various modifications can be made by those skilled in the art without departing from the scope and spirit of the invention.

What is claimed is:

1. A non-client-server system for compressing and decompressing video using a sequence of reference frames, comprising:
   an encoder; and
   a decoder, wherein:
   the encoder and decoder are each configured to generate approximated reference frames from previous corrected reference frames in the sequence using three-dimensional mapping;
   the encoder is configured to generate a plurality of difference reference frames by subtracting the approximated reference frames from corresponding exact reference frames;
   the encoder is configured to provide the difference reference frames to the decoder and is configured to use the difference reference frames in creating the corrected reference frames at the encoder; and
   the decoder is configured to receive the difference reference frames from the encoder and is configured to create the corrected reference frames at the decoder based on the difference reference frames and the approximated reference frames.

2. The non-client-server system defined in claim 1 wherein the decoder is further configured to generate approximated display reference frames based on the corrected reference frames.

3. The non-client-server system defined in claim 1 wherein the decoder is further configured to generate approximated display frames based on the corrected reference frames, wherein more approximated display frames are generated than approximated reference frames.

4. The non-client-server system defined in claim 1 wherein the decoder is further configured to generate approximated display frames based on the corrected reference frames, wherein more than ten approximated display frames are generated for each approximated reference frame.

5. The non-client-server system defined in claim 1 wherein the encoder is further configured to compress the difference reference frames before providing the difference reference frames to the decoder.

6. The non-client-server system defined in claim 1 wherein the encoder is further configured to compress the difference reference frames using JPEG compression before providing the difference reference frames to the decoder.

7. The non-client-server system defined in claim 1 wherein the encoder is further configured to compress the difference reference frames using lossy compression before providing the difference reference frames to the decoder.

8. The non-client-server system defined in claim 1, wherein the encoder and decoder are further configured to perform the three-dimensional mapping based on three-dimensional model state information and wherein the model state information involves a camera point-of-view that is used to create range data.

9. The non-client-server system defined in claim 1, wherein the encoder and decoder are further configured to perform the three-dimensional mapping based on three-dimensional model state information, wherein the model state information involves a camera point-of-view that is used to create range data, and wherein the encoder is further configured to stream the difference reference frames to the decoder over a communications network.

10. The non-client-server system defined in claim 1, wherein the encoder is further configured to stream the difference reference frames to the decoder over a communications network.

11. The non-client-server system defined in claim 1, wherein the encoder is further configured to stream the difference reference frames to the decoder over a communications network and wherein the encoder is further configured to encode information based on user inputs.

12. The non-client-server system defined in claim 1, wherein the encoder is further configured to prepare the difference reference frames offline for subsequent use by the decoder.

13. A system for compressing video using a sequence of reference frames, wherein the compressed video is decompressed by a decoder, the system comprising an encoder configured to:
generate approximated reference frames from previous corrected reference frames in the sequence using a three-dimensional mapping;
generate a plurality of difference reference frames by subtracting the approximated reference frames from corresponding exact reference frames; and
provide the difference reference frames to the decoder for use in creating corrected reference frames at the decoder based on the difference reference frames and approximated reference frames, wherein the generation of the approximated reference frames at the encoder involves calculating a quality factor for pixels in the approximated reference frames that are being mapped between the corrected reference frames and the approximated reference frames by the three-dimensional mapping.

14. The system defined in claim 13 wherein the quality factor is based on a combination of pixel visibility and local scaling factor.

15. The system defined in claim 13 wherein the difference reference frames include only pixels that have been determined to be of low quality.

16. The system defined in claim 13 wherein the difference reference frames include only pixels that have been determined to be of low quality and wherein the difference reference frames are packed before being provided to the decoder.

17. The system defined in claim 13 wherein pixels in the approximated reference frames have similar depth values and a high quality.

18. The system defined in claim 13 wherein pixels in the approximated reference frames have similar depth values and a high quality, wherein given pixels in the approximated reference frames are generated from pixels in the corrected reference frames by calculating a weighted average RGB value for a group of pixels neighboring each given pixel, and wherein the weighted average uses weights that are based on the inverse of the distance between the neighboring pixels and each given pixel.

19. A system for compressing video using a sequence of reference frames, wherein the compressed video is decompressed by a decoder, the system comprising an encoder configured to:
generate approximated reference frames from previous corrected reference frames in the sequence using a three-dimensional mapping;
generate a plurality of difference reference frames by subtracting the approximated reference frames from corresponding exact reference frames; and
provide the difference reference frames to the decoder for use in creating corrected reference frames at the decoder based on the difference reference frames and approximated reference frames, wherein a pool of the corrected reference frames is selected by the encoder and a quality factor is computed for the three-dimensional mapping of pixels in the corrected reference frames to pixels in the approximated reference frame, and wherein pixels are mapped to the approximated reference frame from the corrected reference frames associated with the highest quality pixels.

20. The system defined in claim 19, wherein pixels are mapped to each approximated reference frame from multiple corrected reference frames.

21. A system for compressing video using a sequence of reference frames, wherein the compressed video is decompressed by a decoder, the system comprising an encoder configured to:
generate approximated reference frames from previous corrected reference frames in the sequence using a three-dimensional mapping;
generate a plurality of difference reference frames by subtracting the approximated reference frames from corresponding exact reference frames; and
provide the difference reference frames to the decoder for use in creating corrected reference frames at the decoder based on the difference reference frames and approximated reference frames, wherein the three-dimensional mapping is performed using a Z-buffer.

22. A system for compressing video using a sequence of reference frames, wherein the compressed video is decompressed by a decoder, the system comprising an encoder configured to:
generate approximated reference frames from previous corrected reference frames in the sequence using a three-dimensional mapping;
generate a plurality of difference reference frames by subtracting the approximated reference frames from corresponding exact reference frames; and
provide the difference reference frames to the decoder for use in creating corrected reference frames at the decoder based on the difference reference frames and approximated reference frames, wherein the encoder is further configured to perform the three-dimensional mapping based on three-dimensional model state information, wherein the model state information involves a camera point-of-view that is used to create range data, and wherein the three-dimensional model state information is simplified before being provided to the decoder.

23. A system for compressing video using a sequence of reference frames, wherein the compressed video is decompressed by a decoder, the system comprising an encoder configured to:
generate approximated reference frames from previous corrected reference frames in the sequence using a three-dimensional mapping;

generate a plurality of difference reference frames by subtracting the approximated reference frames from corresponding exact reference frames;

provide the difference reference frames to the decoder for use in creating corrected reference frames at the decoder based on the difference reference frames and approximated reference frames;

stream the difference reference frames to the decoder over a communications network; and encode information based on user inputs, wherein the decoder uses an extrapolator to extrapolate future user inputs and transmit them to the encoder.

24. A system for compressing video using a sequence of reference frames, wherein the compressed video is decompressed by a decoder, the system comprising an encoder configured to:

generate approximated reference frames from previous corrected reference frames in the sequence using a three-dimensional mapping;

generate a plurality of difference reference frames by subtracting the approximated reference frames from corresponding exact reference frames; and provide the difference reference frames to the decoder for use in creating corrected reference frames at the decoder based on the difference reference frames and approximated reference frames, wherein a real-world camera is used to create the exact reference frames.

25. The system defined in claim 24 wherein the real-world camera includes a range scanner that generates depth information for the exact reference frames.

26. A system for compressing video using a sequence of reference frames, wherein the compressed video is decompressed by a decoder, the system comprising an encoder configured to:

generate approximated reference frames from previous corrected reference frames in the sequence using a three-dimensional mapping;

generate a plurality of difference reference frames by subtracting the approximated reference frames from corresponding exact reference frames; and provide the difference reference frames to the decoder for use in creating corrected reference frames at the decoder based on the difference reference frames and approximated reference frames, wherein at least some of the exact reference frames are associated with vertices in a directional graph.

27. The system defined in claim 26 wherein the directional graph includes edges and wherein a sequence of difference reference frames is associated with each edge.

28. The system defined in claim 26 wherein the directional graph includes edges and source and target vertices and wherein a sequence of difference reference frames including a first difference reference frame and a last difference reference frame is associated with a given one of the edges so that the source and target vertices are respectively associated with the first and last difference reference frames.

29. The system defined in claim 26 wherein the directional graph includes edges and source and target vertices, wherein a sequence of difference reference frames including a first difference reference frame and a last difference reference frame is associated with a given one of the edges so that the source and target vertices are respectively associated with the first and last difference reference frames, and wherein the encoder prepares the difference reference frames offline.

30. The system defined in claim 26 wherein the directional graph includes edges and source and target vertices, wherein a sequence of difference reference frames including a first difference reference frame and a last difference reference frame is associated with a given one of the edges so that the source and target vertices are respectively associated with the first and last difference reference frames, wherein the encoder prepares the difference reference frames offline, and wherein the decoder is used to select a path through the graph.

31. The system defined in claim 26 wherein the directional graph includes edges and source and target vertices, wherein a sequence of reference frames is associated with each edge and a first one of these reference frames is associated with the source vertex and a last one of these reference frames is associated with the target vertex, wherein the first reference frame is a last corrected reference frame from a sequence of corrected reference frames that share the source vertex with the given edge.

32. The system defined in claim 26 wherein the directional graph includes edges and source and target vertices, wherein a sequence of reference frames is associated with each edge and a first one of these reference frames is associated with the source vertex and a last one of these reference frames is associated with the target vertex, wherein the encoder and decoder perform the three-dimensional mapping based on three-dimensional model state information, wherein the encoder is configured to provide no three-dimensional model state information to the decoder for the source vertex of a given edge, and wherein the decoder uses instead model state information associated with a final reference frame of the sequence of reference frames used for another edge.

* * * * *